US012782572B2

(12) United States Patent
Lin et al.

(10) Patent No.: US 12,782,572 B2
(45) Date of Patent: Nov. 3, 2026

(54) HEATING BODY SENSING METHOD, APPARATUS, DEVICE, AND STORAGE MEDIUM

(71) Applicant: Luxshare Precision Industry Company Limited, Shenzhen (CN)

(72) Inventors: Jhih-Li Lin, Shenzhen (CN); Chih Wei Wu, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 386 days.

(21) Appl. No.: 18/600,196

(22) Filed: Mar. 8, 2024

(65) Prior Publication Data

US 2024/0329250 A1 Oct. 3, 2024

(30) Foreign Application Priority Data

Mar. 27, 2023 (CN) ......................... 202310355675.7

(51) Int. Cl.
*G01S 17/04* (2020.01)
*G01S 17/86* (2020.01)

(52) U.S. Cl.
CPC .............. *G01S 17/86* (2020.01); *G01S 17/04* (2020.01)

(58) Field of Classification Search
CPC .. F24F 11/00; F24F 11/30; F24F 11/46; F24F 11/47; F24F 11/50; F24F 11/52; F24F 11/523; F24F 11/56; F24F 11/58; F24F 11/62; F24F 11/63; F24F 11/70; F24F 11/89; F24F 2110/00; F24F 2110/10; F24F 2120/10; F24F 2120/12; F24F 2120/14; F24F 2140/60; G01J 5/0025; G01J 5/041; G01K 1/02; G01R 31/26; G05B 15/02; G05B 13/028; G05B 19/4183; G05B 19/4184; G05B 19/41845; G05B 19/4185; G05B 19/41865; G05B 19/41875; G05B 2219/32287; G05B 2219/35001; G05B 2219/37337; G05B 2219/37351;
(Continued)

(56) References Cited

U.S. PATENT DOCUMENTS 4,734,554 A * 3/1988 Tateda ................ H05B 6/6458
374/149
7,362,224 B2 4/2008 Zambon
(Continued)

FOREIGN PATENT DOCUMENTS

CN 110286627 A 9/2019
CN 111158062 A 5/2020
(Continued)

*Primary Examiner* — Daniel Previl
(74) *Attorney, Agent, or Firm* — Birch, Stewart, Kolasch & Birch, LLP

(57) ABSTRACT

Embodiments of the present disclosure disclose a heating body sensing method, apparatus, device, and storage medium. A detection temperature is acquired by receiving a first detection signal, the change of a heat source is acquired according to a receiving state of a second detection signal, and a sensing signal is generated according to the first detection signal and the receiving state of the second detection signal to determine the presence condition of a heating body. Therefore, the sensing cost of the heating body may be reduced, and the sensing efficiency may be improved.

18 Claims, 5 Drawing Sheets

(58) Field of Classification Search

CPC ........... G05B 2219/37434; G05B 2219/40115; G05B 2219/45004; G05B 2219/45129; G05B 23/0221; G05B 23/0229; G05B 23/024; G05B 23/0264; G05B 23/0283; G05B 23/0286; G05B 23/0289; G05B 23/0291; G05B 23/0294; G05B 23/0297; G05B 19/042; G05B 17/02; G05B 19/41885; G05B 2219/37537; G05B 19/0426; G05B 2219/31457; G05B 23/02; G05B 23/0208; G05D 23/19; G05D 23/1902; G05D 23/1919; G05D 23/1932; G05D 23/24; G05D 23/2454; G05D 23/27; G05D 23/275; G06F 1/3231; G06F 1/3265; G06F 1/3287; G06F 3/011; G06F 3/016; G06F 3/02; G06F 3/0202; G06F 3/0304; G06F 3/0362; G06F 3/042; G06F 3/0482; G06F 3/04842; G06F 3/04847; G06F 3/0487; G06F 3/167; G06F 18/2178; G06F 16/9538; G06F 16/9577; G06F 2203/0381; G06F 3/012; G06F 3/013; G06F 3/015; G06F 3/017; G06F 1/163; G06F 1/1686; G06F 1/1694; G06F 18/21; G06F 18/25; G06F 2203/04801; G06F 3/014; G06F 3/04812; G06F 3/04817; G06F 16/2477; G06F 17/18; G06F 18/217; G06F 3/0608; G06F 3/0619; G06F 3/0635; G06F 3/067; G06N 20/00; G06N 3/045; G06N 3/084; G06N 3/09; G06N 3/006; G06N 3/02; G06N 3/044; G06N 3/0464; G06N 3/047; G06N 3/088; G06N 3/126; G06N 5/046; G06N 7/01; G06N 3/0499; G06N 5/04; G06N 20/10; G06N 5/01; G06N 5/025; G06N 5/043; H01H 25/06; H04L 67/10; H04L 1/0002; H04L 1/0009; H04L 1/0041; H04L 1/18; H04L 5/0064; H04L 67/1097; H04L 67/12; H04L 1/0076; H04L 1/1874; H04L 27/362; H04L 67/306; H04L 67/562; H04L 67/566; H04L 1/0057; H04L 1/16; H04L 1/1854; H04L 1/1867; H04L 27/0014; H04L 41/084; H04L 41/142; H04L 41/145; H04L 41/147; H04L 41/149; H04L 41/16; H04L 43/024; H04L 5/0008; H04L 67/125; H04L 69/08; Y02B 70/30; Y02B 30/00; Y02D 30/50; Y02D 30/70; Y02T 10/88; Y04S 20/20; Y04S 10/00; Y04S 20/00; Y04S 30/00; Y04S 40/00; Y04S 50/00; G02B 6/02323; G02B 6/02333; G02B 6/02357; G02B 6/02342; G02B 6/02347; G02B 6/024; G02B 1/005; G02B 6/02309; G02B 6/02361; G02B 6/02371; C03B 2203/30; C03B 2203/42; C03B 37/01274; C03B 37/02709; C03B 37/0279; A61B 5/0077; A61B 5/0205; A61B 5/02405; A61B 5/02416; A61B 5/0816; A61B 5/113; A61B 5/4806; A61B 5/6891; A61B 5/6892; A61B 5/7275; A61B 5/742; A61B 2560/0252; A61B 2560/0209; A61B 2560/0223; A61B 2560/0257; A61B 2560/0266; A61B 2560/029; A61B 2562/0223; A61B 2562/0257; A61B 5/0031; A61B 5/145; A61B 5/14503; A61B 5/14532; A61B 5/14546; A61B 5/1455; A61B 5/1495; A61B 5/6847; A61B 5/6849; A61B 2562/0219; A61B 5/02055; A61B 5/08; A61B 5/1118; A61B 5/384; A61B 5/4809; A61B 5/4812; A61B 5/681; A61B 18/1492; A61B 18/18; A61B 2018/0022; A61B 2018/00285; A61B 2018/00434; A61B 2018/00577; A61B 2018/00642; A61B 2018/00648; A61B 2018/00702; A61B 2018/00791; A61B 2018/00875; A61B 2018/1467; A61B 2018/1475; A61B 5/0022; A61B 5/01; A61B 5/021; A61B 5/024; A61B 5/02438; A61B 5/0533; A61B 5/1116; A61B 5/14551; A61B 5/257; A61B 5/332; A61B 5/389; A61B 5/398; A61B 5/4815; A61B 5/4818; A61B 5/4857; A61B 5/6814; A61B 5/6824; A61B 5/6826; A61B 5/7264; A61B 2562/185; A61B 5/0004; A61B 5/0006; A61B 5/0008; A61B 5/0013; A61B 5/002; A61B 5/0075; A61B 5/02028; A61B 5/0261; A61B 5/053; A61B 5/11; A61B 5/1112; A61B 5/1115; A61B 5/1117; A61B 5/14552; A61B 5/395; A61B 5/4561; A61B 5/486; A61B 5/4875; A61B 5/6803; A61B 5/6806; A61B 5/6807; A61B 5/6823; A61B 5/6833; A61B 5/6843; A61B 5/7267; A61B 5/7278; A61B 5/7282; A61B 5/7405; A61B 5/7455; A61B 7/00; A61B 7/04; A61B 7/045; A61B 8/00; A61B 8/06; A61B 8/0808; A61B 8/4427; A61B 8/488; A61B 8/565; A61H 2201/0176; A61H 33/005; F24H 15/172; F24H 15/212; F24H 15/281; F24H 15/335; F24H 15/345; F24H 15/37; F24H 15/395; F24H 15/407; F24H 15/414; F24H 9/2028; G01S 17/04; G01S 17/86; H02H 3/335; H02H 5/105; H05B 2213/05; H05B 6/065; H05B 6/1218; H05B 6/1272; H04Q 2209/40; H04Q 2209/43; H04Q 2209/823; H04Q 2209/883; H04Q 9/00; H04W 76/14; H04W 4/38; H04W 4/70; H04W 48/08; H04W 48/16; H04W 52/16; H04W 52/246; H04W 52/362; H04W 56/001; H04W 72/21; H04W 84/18; Y02P 90/02; Y02P 80/10; Y02P 90/80; Y02P 90/84; Y02P 90/30; G06Q 30/02; G06Q 30/0201; G06Q 30/0251; G06Q 30/0282; G06Q 30/06; G06Q 10/20; G06Q 10/04; G06Q 10/063; G06Q 10/0631; G06Q 10/063118; G06Q 10/06316; G06Q 10/0639; G06Q 10/083; G06Q 10/087; G06Q 10/103; G06Q 30/0278; G06Q 50/00; G06Q 50/04; G06Q 50/08; G06V 10/82; G06V 20/20; G06V 40/174; G06V 40/18; G06V 10/764; G06V 10/7715; G06V 20/176; G06V 20/194; G06V 10/7784; G06V 10/95; G06V 20/17; G06V 2201/05

USPC ..... 340/992, 994, 449, 477, 539.22, 539.26, 340/565, 588, 636.11, 640, 641, 655, 340/686.1

See application file for complete search history.

(56) References Cited

U.S. PATENT DOCUMENTS

| | | | | |
|---|---|---|---|---|
| 9,140,609 | B2 * | 9/2015 | Kleihorst | G01J 5/0022 |
| 9,939,164 | B2 * | 4/2018 | Kusukame | F24F 11/77 |
| 11,506,818 | B1 * | 11/2022 | Chenard | G02B 6/02323 |
| 2017/0097264 | A1 | 4/2017 | Tonami et al. | |
| 2021/0405287 | A1 * | 12/2021 | Chenard | C03B 37/01274 |

FOREIGN PATENT DOCUMENTS

| | | | |
|---|---|---|---|
| CN | 112738653 | B | 5/2022 |
| CN | 111599053 | B | 12/2022 |
| CN | 111766453 | B | 3/2023 |
| JP | 2012-215402 | A | 11/2012 |
| WO | WO 2019/102645 | A1 | 5/2019 |

* cited by examiner

--Prior Art--

HEATING BODY SENSING METHOD, APPARATUS, DEVICE, AND STORAGE MEDIUM

CLAIM OF PRIORITY AND CROSS-REFERENCE TO RELATED APPLICATION(S)

This application claims the benefit of Chinese Patent Application No. 202310355675.7, filed on Mar. 27, 2023, which is incorporated herein by reference in its entirety.

BACKGROUND OF THE DISCLOSURE

1. Field of the Disclosure

The present disclosure relates to the technical field of intelligent sensing, and particularly to a heating body sensing method, apparatus, device, and storage medium.

2. Description of the Related Art

With the development of society, an object detection technology is more and more widely applied to intelligent identification of an electronic device. At present, in most of the prior arts, operations are performed under the hardware collocation of one transmission and one reception to confirm people in a specific space. In the one transmission and one reception, one transmission represents that a given light source illuminates the specific space, and one reception represents that a given sensor continuously receives the reflection of the given light source for the specific space.

However, by the one transmission and one reception technology, due to the high cost of the core hardware thereof, products are popularized difficultly; moreover, at least medium and high-order central processing unit/processor (CPU) hardware is required to do a large number of complex real-time operations, and the data processing efficiency is low; meanwhile, the system has low falling resistance; furthermore, in a case that a certain degree of dust is present in the environment, the identification determination will be in failure.

BRIEF DESCRIPTION OF THE DISCLOSURE

In view of this, embodiments of the present disclosure provide a heating body sensing method, apparatus, device, and storage medium, thereby reducing the sensing cost under the presence condition of a heating body and improving the sensing efficiency.

According to a first aspect, a heating body sensing method is provided. The method includes:

- receiving and storing a first detection signal, the first detection signal being used to represent a detection temperature;
- determining a receiving state of a second detection signal, wherein the receiving state comprises that: the second detection signal is received and the second detection signal is not received, and the second detection signal is used to represent that a heat source changes; and
- generating a sensing signal according to the first detection signal and the receiving state of the second detection signal, the sensing signal being used to represent the presence condition of a heating body.

In some embodiments, the sensing signal includes a first signal and a second signal, where the first signal is used to represent the presence of a heating body, and the second signal is used to represent the absence of a heating body.

In some embodiments, the generating a sensing signal according to the first detection signal and the receiving state of the second detection signal includes:

- in response to receiving the second detection signal which is received for the first time, generating the sensing signal as the first signal.

In some embodiments, the generating a sensing signal according to the first detection signal and the receiving state of the second detection signal includes:

- in response to receiving the second detection signal which is not received for the first time, generating the sensing signal according to a representation of the first detection signal.

In some embodiments, the generating the sensing signal according to the representation of the first detection signal specifically includes:

- generating the sensing signal periodically according to the representation of the first detection signal.

In some embodiments, the generating the sensing signal periodically according to the representation of the first detection signal specifically includes:

- determining a detection duration of a current period, the detection duration of the current period being a time difference between a current time and a time when the second detection signal is received;
- in response to that the detection duration is less than or equal to a second predetermined duration, generating a sensing signal of the current period according to a representation of the first detection signal; and
- in response to that the detection duration is greater than the second predetermined duration, ending this detection and keeping the sensing signal unchanged.

In some embodiments, the generating a sensing signal of the current period according to the representation of the first detection signal includes:

- acquiring a reference signal from data storing the first detection signal, the reference signal being a first detection signal at a time corresponding to a first predetermined duration before the current time;
- detecting temperature difference data according to the reference signal and the first detection signal at the current time;
- in response to that the temperature difference data is greater than a preset upper limit value, generating the sensing signal as a first signal;
- in response to that the temperature difference data is less than a preset lower limit value, generating the sensing signal as a second signal; and
- in response to that the temperature difference data is greater than or equal to a preset lower limit value and is less than or equal to the preset upper limit value, keeping the sensing signal unchanged.

According to a second aspect, a heating body sensing apparatus is provided. The apparatus includes:

- a receiving module, configured to receive and store a first detection signal, where the first detection signal is used to represent a detection temperature;
- a determining module, configured to determine a receiving state of a second detection signal, where the receiving state includes that: the second detection signal is received and the second detection signal is not received, and the second detection signal is used to represent that a heat source changes; and
- a generation module, configured to generate a sensing signal according to the first detection signal and the receiving state of the second detection signal, where the sensing signal is used to represent the presence condition of a heating body.

According to a third aspect, a heating body sensing device is provided. The heating body sensing device includes:

a first detection unit, configured to acquire a first detection signal;

a second detection unit, configured to acquire a second detection signal; and a memory and a processor, where the memory is configured to store one or more computer program instruction, and the one or more computer program instructions are executed by the processor to implement the method according to the first aspect.

According to a fourth aspect, a computer-readable storage medium is provided. The computer-readable storage medium stores a computer program; and when the computer program is executed by a processor, the method according to the first aspect is implemented.

According to the embodiments of the present disclosure, a detection temperature is acquired by receiving a first detection signal and is stored, the change of a heat source is acquired according to a receiving state of a second detection signal, and a sensing signal is generated according to the first detection signal and the receiving state of the second detection signal to determine the presence condition of a heating body. Therefore, the sensing cost of the heating body may be reduced, and the sensing efficiency may be improved.

BRIEF DESCRIPTION OF THE DRAWINGS

The foregoing and other objectives, features and advantages of the present disclosure will become more clearly from the following description of embodiments of the present disclosure with reference to the accompanying drawings. In the drawings.

DETAILED DESCRIPTION OF EMBODIMENTS OF THE DISCLOSURE

The present disclosure is described below based on embodiments, but the present disclosure is not only limited to these embodiments. In the following detailed description of the present disclosure, some specific details are described in detail. The present disclosure may be fully understood by those skilled in the art without the description of these detailed parts. To avoid confusing the essence of the present disclosure, well-known methods, processes, flows, elements and circuits are not described in detail.

In addition, it should be understood by those of ordinary skill in the art that the drawings provided herein are for illustrative purposes, and the drawings are not necessarily drawn to scale.

Meanwhile, it should be understood that in the following description, "circuit" refers to a conductive loop constituted by at least one element or sub-circuit through an electrical connection or an electromagnetic connection. When an element or circuit is referred to as being "connected to" another element or an element/circuit is referred to as being "connected" between two nodes, it may be directly coupled or connected to another element or there may be intermediate elements, and the connection between the elements may be physical, logical, or a combination thereof. On the contrary, when an element is referred to as being "directly coupled to" or "directly connected to" another element, it means that there is no intermediate element between the two elements.

Unless specifically required in the context, words like "include", "contain" and the like in the description should be interpreted as inclusive rather than exclusive or exhaustive meanings, that is to say, "including, but not limited to".

In the description of the present disclosure, it should be understood that the terms "first", "second" and the like are merely used for descriptive purposes, but cannot be understand as indicating or implying relative importance. Moreover, in the description of the present disclosure, unless otherwise stated, "a plurality of" means two or more.

With the development of society, object detection is more and more widely applied to various scenarios. In the prior art, generally, operations are performed through one transmission and one reception hardware in combination with a light detection and ranging (LiDAR), time of flight (TOF) or structure light algorithm to confirm an object in a specific space.

Figure 1:
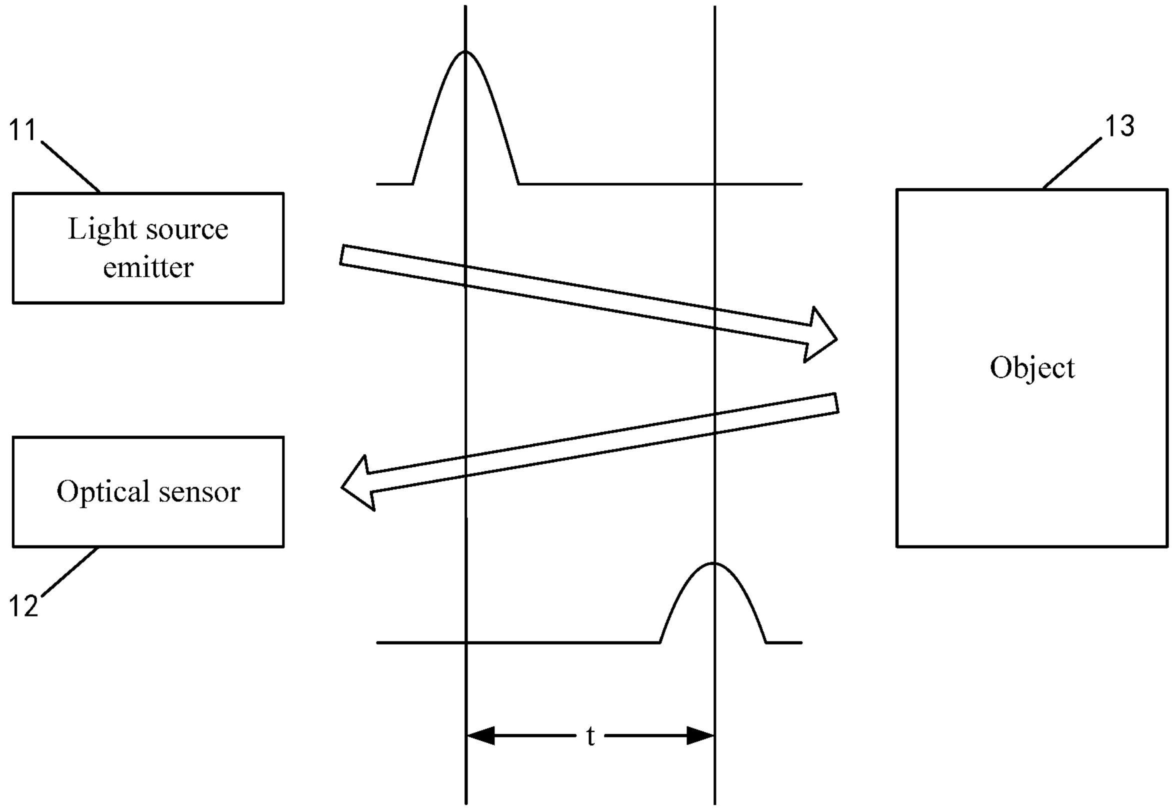
FIG. 1 is a schematic diagram of an existing object detection technology.

The principle of the LiDAR algorithm is shown in FIG. 1, a light source emitter (for example, a laser diode) 11 emits a light pulse to an object 13, the object 13 reflects the emitted light pulse back to an optical sensor 12, the light source emitter calculates a time difference t between the corresponding pulse emitted from the light source emitter 11 and reflected to the optical sensor 12 and performs an operation with a light speed to obtain a distance, a LiDAR system has a high-speed reflecting mirror which may give different emitting angles of the light source to scan the specific direction/space, the data after scanning is a distance data matrix, and an outline may be obtained from the data matrix through a special algorithm so as to know whether people is present or not.

The difference of the TOF algorithm is that the light source is emitted at a specially controlled frequency, in a case that the reflected light received by a receiver conforms to the controlled frequency, the algorithm will effectively take the reflected light, and perform an operation with the light speed in the process time to obtain the distance, like LiDAR.

The structure light algorithm is: the light source emits a controlled special pattern, the reflected light returns to a receiver, the algorithm will make a Fourier expression on the known emitted light pattern and the reflected light pattern to be converted into a distance and then be converted into an outline, and finally, whether people is present or not is known.

However, the operation is performed by a one transmission and one reception hardware collocation method to determine the object in the specific space, at least medium and high-order CPU hardware is required to do a large number of complex real-time operation, the used core hardware has high cost, so that products are popularized difficultly and may be owned by only high-end consumer groups. Meanwhile, the system has low falling resistance. Furthermore, in a case that a certain degree of dust is present in the environment, the identification determination will be in failure.

In view of this, the present disclosure provides a heating body sensing method and apparatus, thereby reducing the sensing cost under the presence of a heating body and improving the sensing efficiency.

Figure 2:
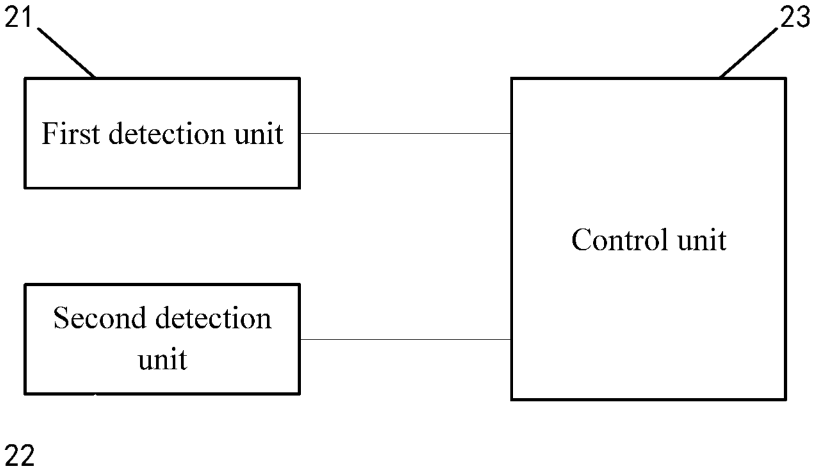
FIG. 2 is a schematic diagram of a heating body sensing device according to an embodiment of the present disclosure.

FIG. 2 is a schematic diagram of a heating body sensing device according to an embodiment of the present disclosure. In the embodiment shown in FIG. 2, the heating body sensing device includes a first detection unit 21, a second detection unit 22 and a control unit 23.

The first detection unit 21 is configured to acquire a first detection signal, and the first detection signal is used to represent a detection temperature. More specifically, the representation of the first detection signal is a temperature value.

In some implementation manners, the first detection unit may be implemented by an infrared temperature sensor. The infrared temperature sensor is a sensor for detecting the temperature of an object by infrared rays, has the advantages of high sensitivity and the like, and is often used for non-contact temperature measurement. Specifically, since all objects above absolute zero in nature are constantly radiating energy outward, the magnitude of the outward radiation energy of an object and the distribution of the object according to the wavelength are closely related to the surface temperature of the object. The higher of the temperature of the object is, the stronger the ability of emitting the infrared radiation is. The infrared temperature sensor measures the absorbed infrared radiation by utilizing the heat effect of infrared radiation and through thermoelectric effect, pyroelectric effect and a thermistor, and indirectly measures the temperature of the object for radiating infrared light.

It should be understood that detecting temperature by the infrared temperature sensor is only one implementation manner of the embodiments of the present disclosure, and in some other implementation manners, the first detection unit may detect the temperature in a monitoring range through various other devices capable of continuously receiving heat sources, for example, a temperature sensor for radiation temperature measurement and a contact type temperature sensor, which will not be limited by the embodiments of the present disclosure.

The second detection unit 22 is configured to output a second detection signal, and the second detection signal is used to represent that the heat source changes. That is, when the heat source in the detection range of the second detection unit 22 changes, the second detection signal is output.

In some implementation manners, the second detection unit 22 may be implemented by a pyroelectric infrared sensor. The pyroelectric infrared sensor is configured to detect infrared rays emitted by a heating body (for example, people or some animals) and convert the infrared rays into electrical signals for output. The pyroelectric infrared sensor detects temperature change, so when the ambient temperature is stable, the pyroelectric infrared sensor has no output. When the heating body enters the monitoring range, since the temperature of the heating body is different from the ambient temperature, the pyroelectric infrared sensor detects that temperature changes and outputs a second detection signal. In a case that the heating body does not move after entering the monitoring range, the temperature does not change and the pyroelectric infrared sensor has no output. When the heating body leaves a detection area, since the temperature of the heating body is different from the ambient temperature, the pyroelectric infrared sensor detects that temperature changes and outputs the second detection signal. Therefore, the activity of the heating body, such as a human body or animal, may be detected by the pyroelectric infrared sensor, and may be converted into an electrical signal for output. It should be understood that detecting the change of the heat source by the pyroelectric infrared sensor is only one implementation manner of the embodiments of the present disclosure, and in some other implementation manners, the change of the heat source in the monitoring range may be detected through other various manners, for example, an optical sensor and a radar sensor, which will not limited by the embodiments of the present disclosure.

The control unit 23 includes a processor and a memory, and the memory is suitable for storing an instruction or program executable by the processor. The processor may be an independent microprocessor, or may be one or more microprocessor sets. Thus, the processor performs the heating body sensing method of the embodiments of the present disclosure by executing the instruction stored by the memory.

It should be noted that the embodiments of the present disclosure do not limit the use scenario of the heating body sensing device and may be applied to existing various detection scenarios, for example, may performing recognizable intelligent updating on devices, electrical appliances and 3C products (a washing machine, a refrigerator, cold and warm air, a lamp for lighting, a computer, VR and a food processor) interacting with a heat source (people, pets and environment), may serve as intelligent upgrading of intelligent power-saving/rapid waking up the above various devices, electrical appliances and 3C products, and may be configured to collect big data of “attendance rate” and “use rate”.

Figure 3:
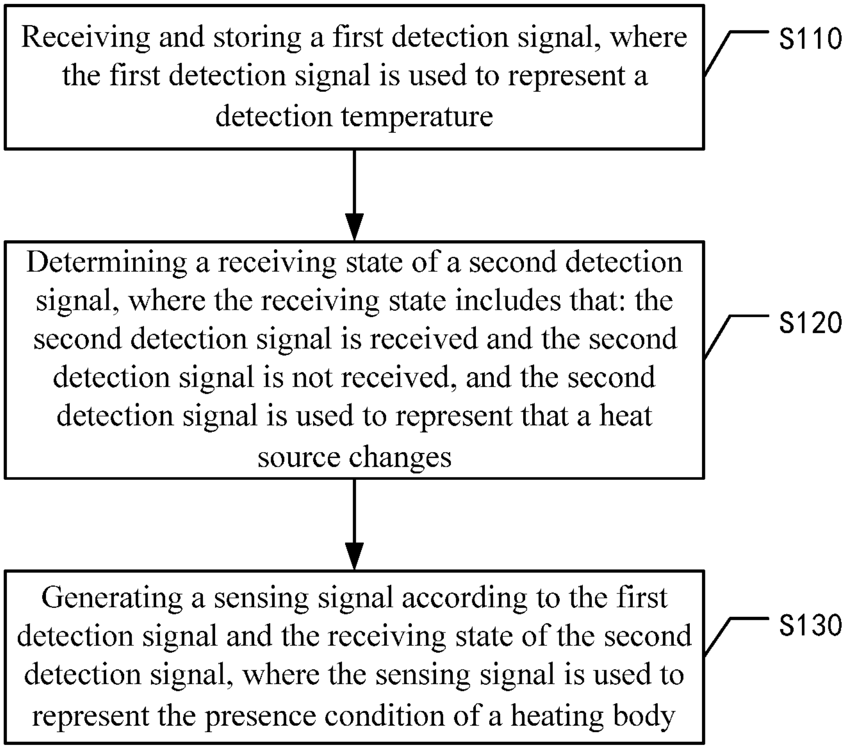
FIG. 3 is a flowchart of a heating body sensing method according to an embodiment of the present disclosure.

Specifically, FIG. 3 is a flowchart of a heating body sensing method according to an embodiment of the present disclosure. The heating body sensing method shown in FIG. 3 is performed by the control unit and specifically includes the following steps:

Step S110: receiving and storing a first detection signal, where the first detection signal is used to represent a detection temperature.

In some implementation manners, the first detection unit continuously detects the temperature in the monitoring range to acquire the first detection signal, the infrared sensor transmits the acquired first detection signal to the control unit, and the received first detection signal is stored by the control unit, where the first detection signal is used for representing a detection temperature.

Further, the control unit samples the first detection signal according to a predetermined time interval, and stores the first detection signal. The predetermined time interval may be set according to an actual application scenario, for example, 100 milliseconds or 1 second. That is, the first detection unit continuously acquires the first detection signal and outputs the first detection signal to the control unit, and the control unit samples the received first detection signal according to the predetermined time interval and stores the received first detection signal.

In some embodiments, the stored data further includes time information corresponding to each first detection signal in addition to the first detection signal mentioned above.

Step S120: determining a receiving state of a second detection signal, where the receiving state includes that: the second detection signal is received and the second detection signal is not received, and the second detection signal is used to represent that a heat source changes.

In some implementation manners, whether the heat source changes is determined by whether the pyroelectric infrared sensor acquires the second detection signal. After the pyroelectric infrared sensor receives the second detection signal, it indicates that the heat source in the monitoring range changes, the pyroelectric infrared sensor transmits the second detection signal to the control unit, and after the control units receives the second detection unit, corresponding data processing is started.

Specifically, the pyroelectric infrared sensor detects temperature change, so when the ambient temperature is stable, the pyroelectric infrared sensor has no output. When the heating body enters the monitoring range, since the temperature of the heating body is different from the ambient temperature, the pyroelectric infrared sensor detects that temperature changes and outputs the second detection signal, and after the control unit receives the second detection signal, corresponding data processing is started. In a case that the heating body does not move after entering the monitoring range, the temperature does not change and the pyroelectric infrared sensor has no output. When the heating body leaves a detection area, since the temperature of the heating body is different from the ambient temperature, the pyroelectric infrared sensor detects that temperature changes and outputs the second detection signal, and after the control unit receives the second detection signal, corresponding data processing is started. Therefore, the activity of the heating body, such as a human body or animal, may be detected by the pyroelectric infrared sensor, and may be converted into an electrical signal for output.

It should be understood that detecting the temperature change by the pyroelectric infrared sensor is only one implementation manner of the embodiments of the present disclosure, and the change of the heat source in the monitoring range may be detected through other various manners, for example, an optical sensor and a radar sensor, which will not limited by the embodiments of the present disclosure.

Step S130: generating a sensing signal according to the first detection signal and the receiving state of the second detection signal, where the sensing signal is used to represent the presence condition of a heating body.

The receiving state of the second detection signal includes that: the second detection signal is received and the second detection signal is not received, and the second detection signal is used to represents that the heat source changes. As mentioned above, the second detection signal is used to represent that the heat source changes. Therefore, after the control unit receives the second detection signal, it represents that the heat source in the detection range changes.

Further, the sensing signal includes a first signal and a second signal, where the first signal is used to represent the presence of a heating body, and the second signal is used to represent the absence of a heating body.

Specifically, after the second detection signal is received, whether the second detection signal is received for the first time is determined; in response to that the second detection signal is received for the first time, the sensing signal is generated as a first signal; and in a case that the second detection signal is not received for the first time, the sensing signal is generated according to the representation of the first detection signal.

The step that generating the sensing signal according to the representation of the first detection signal specifically includes: generating the sensing signal periodically according to the representation of the first detection signal. Specifically, in each period, a detection duration of a current period is determined, where the detection duration of the current period is a time difference between a current time and a time when the second detection signal is received; in response to that the detection duration is less than or equal to a second predetermined duration, the sensing signal of the current period is generated according to the representation of the first detection signal; and in response to that the detection duration is greater than the second predetermined duration, this detection is ended, and the sensing signal is kept unchanged.

Specifically, since after the second detection signal is received, it represents that the heat source in the detection range changes, but after that, the heat source in the detection range may keep unchanged for a long time. In a case that the control unit performs detection all the time, the detection result is unchanged. Therefore, to reduce the power consumption, in the embodiments of the present disclosure, a second predetermined duration (for example, 8 seconds, 10 seconds and 15 seconds) is preset; within the second predetermined duration after the second detection signal is received, the sensing signal is generated periodically; and after the second predetermined duration after the second detection signal is received, the sensing signal is not generated any more, and the sensing signal is kept unchanged, thereby reducing the power of the heating body sensing device.

Within the second predetermined duration after the second detection signal is received and within each period, the control unit generates the sensing signal according to the first detection signal at the current time and the stored historical first detection signal. Specifically, a reference signal is acquired from data storing the first detection signal, where the reference signal is a first detection signal at a time corresponding to a first predetermined duration before the current time, and the first predetermined duration is a preset value, for example, 4 seconds and 5 seconds. Taking the case where the first predetermined duration is 5 seconds as an example for description, the reference signal is the first detection signal corresponding to the time 5 seconds before the current time. The reference signal is subtracted from the first detection signal at the current time to determine the temperature difference data. In a case that the temperature difference data is greater than a preset upper limit value, it represents that the temperature in the detection range at the current time is increased higher than the temperature before the first predetermined duration, then the sensing signal is generated as a first signal, representing that a heating body is present at the current time. In a case that the temperature difference data is less than a preset lower limit value, it represents that the temperature in the detection range at the current time changes little before the first predetermined duration, then the sensing signal is generated as a second signal, representing the absence of the heating body in the current period. In a case that the temperature difference data is greater than or equal to a preset lower limit value and less than or equal to the preset upper limit value, the sensing signal is kept unchanged, where that the sensing signal is kept unchanged specifically includes: the sensing signal in the current period is set to be the same as the sensing signal in the previous period. Therefore, the above step is repeated within each period until the difference value between the current time and the time when the second detection signal is received is greater than the second predetermined duration.

It should be understood that in the detection process of the second predetermined duration, the second detection signal is received again, then taking the time when the second detection signal is received again as a starting time, the sensing signal is generated periodically according to the presentation of the first detection signal. That is, taking the case where the second predetermined duration is 8 seconds as an example for description, in a case that the second detection signal is not received again within 8 seconds after the second detection signal is received, the sensing signal within 8 seconds is acquired according to a predetermined period. In a case that the second detection signal is received again within 8 seconds after the second detection signal is received, execution is restarted.

Taking the case where the first predetermined duration is set to 5 seconds and the second predetermined duration is set to 8 seconds as an example for description, assuming that the second detection signal is received at the 20th second after the system is electrified and the second detection signal is not received for the first time, the first detection signal corresponding to 5 seconds before the current time is acquired as a reference signal, that is, the first detection signal corresponding to the 15th second after the system is electrified is acquired as a reference signal corresponding to the 20th second, the first detection signal corresponding to the 15th second is subtracted from the 20th second, it is determined whether the temperature difference data corresponding to the 20th second is greater than a preset upper limit value or less than a preset lower limit value; when the temperature difference data corresponding to the 20th second is greater than the preset upper limit value, the sensing signal is generated as the first signal at the 20th second, representing that a heating body is present; when the temperature difference data corresponding to the 20th second is less than the preset lower limit value, it represents that no heating body is present; when the temperature difference data corresponding to the 20th second is greater than or equal to the preset lower limit value and less than or equal to the preset upper limit value, the sensing signal is kept unchanged, that is, the sensing signal in the current period is set to be the same as the sensing signal in the previous period.

Meanwhile, in each period, it is determined whether the detection duration is less than or equal to 8 seconds. In a case that the detection duration is less than or equal to 8 seconds, the sensing signal at this period is started for timing; and in a case that the detection duration is not less than or equal to 8 seconds, the sensing signal is kept unchanged after this detection is ended.

Furthermore, the second detection signal is received again in the detection period from the 20th second to the 28th second (for example, the 26th second after the system is electrified), then taking the 26th s after the system is electrified as the starting time for timing the second predetermined duration, the sensing signal is generated again periodically according to the representation of the first detection signal.

It should be understood that when the second detection signal is received and the second detection signal is received for the first time, the sensing signal is generated as the first signal. This is because the time difference between the time when the second detection signal is received for the first time and the time when the system is electrified may be less than the first predetermined duration, at this time, the reference signal corresponding to the first detection signal at the current time cannot be acquired, so the corresponding temperature difference cannot be calculated. Therefore, when the second detection signal is received and the second detection signal is received for the first time, the sensing signal is directly generated as the first signal.

According to the embodiments of the present disclosure, a detection temperature is acquired by receiving a first detection signal and is stored, the change of a heat source is acquired according to a receiving state of a second detection signal, and a sensing signal is generated according to the first detection signal and the receiving state of the second detection signal to determine the presence condition of a heating body. Therefore, the sensing cost of the heating body may be reduced, and the sensing efficiency may be improved.

Figure 4:
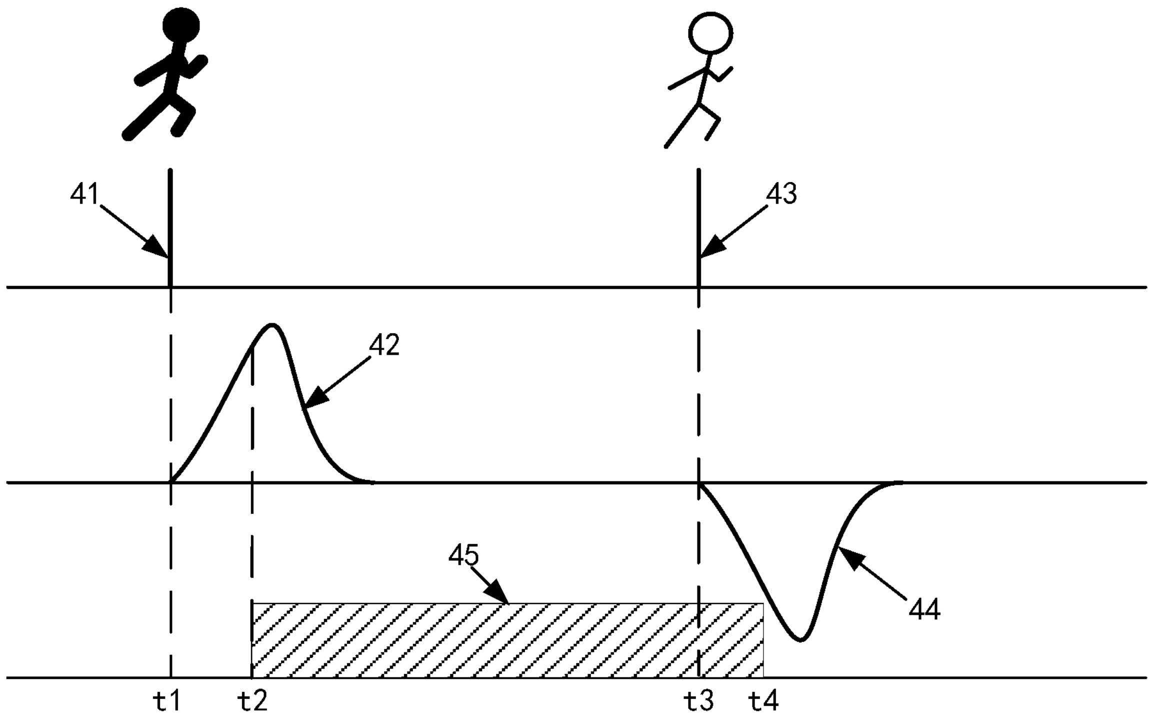
FIG. 4 is a schematic diagram of a signal waveform according to an embodiment of the present disclosure.

FIG. 4 is a schematic diagram of a signal waveform according to an embodiment of the present disclosure. After the system is electrified, the sensor (for example, the infrared sensor) capable of continuously receiving the heat source continuously detects the temperature in the monitoring range to acquire the first detection signal, and stores the acquired first detection signal, where the first detection signal is used to represent the detection temperature. In the embodiment shown in FIG. 4, taking the case where the first predetermined duration is not greater than the second predetermined duration as an example for description, the heating body appears in the monitoring range at the time t1, the temperature in the monitoring range changes, the pyroelectric infrared sensor detects the second detection signal 41, the control unit starts from the time t1 to calculate the temperature difference data according to the stored first detection signal, a waveform 42 takes the time t1 as the starting time to continue the temperature difference data waveform within the time period of the second predetermined duration; and since when the heating body appears in the environment, the ambient temperature is finally changed from a stable state without the heating body to a stable state with the heating body as time goes by. That is, before the heating body enters the monitoring range and after the heating body enters and stays in the monitoring range for a certain time, the ambient temperature is in the stable state. Therefore, the temperature difference data waveform shown in the waveform 42 is increased from 0 to a certain value and then is reduced to 0. The temperature difference data at the time t2 is greater than the preset upper limit value, so the sensing signal is generated as the first signal at the time t2 and is continuously output.

The heating body in the monitoring range at the time t3 leaves, the temperature in the monitoring range changes, the pyroelectric infrared sensor detects the second detection signal 43, the control unit starts from the time t3 to calculate the temperature difference data according to the stored first detection signal, a waveform 44 takes the time t3 as the starting time to continue the temperature difference data waveform within the time period of the second predetermined duration; and since when the heating body in the environment leaves, the ambient temperature is finally changed from a stable state with the heating body to the stable state without the heating body as time goes by. That is, before the heating body leaves the monitoring range and after the heating body leaves the monitoring range for a certain time, the ambient temperature is the stable state; therefore, the temperature difference data waveform shown in the waveform 42 is reduced from 0 to a certain value and then is increased to 0, the temperature difference data at a time t4 is less than a preset lower limit value, and the sensing signal is generated as a second signal at the time t4 and is continuously output.

A waveform 45 is a changing waveform of the sensing signal; before the time t2, the sensing signal is the second signal, representing that no heating body is present in the monitoring range in the time period; within the time t2-t4, the sensing signal is the first signal, representing that a heating body is present in the monitoring range in the time period; and after the time t4, the sensing signal is the second signal, representing that no heating body is present in the monitoring range in the time period.

Figure 5:
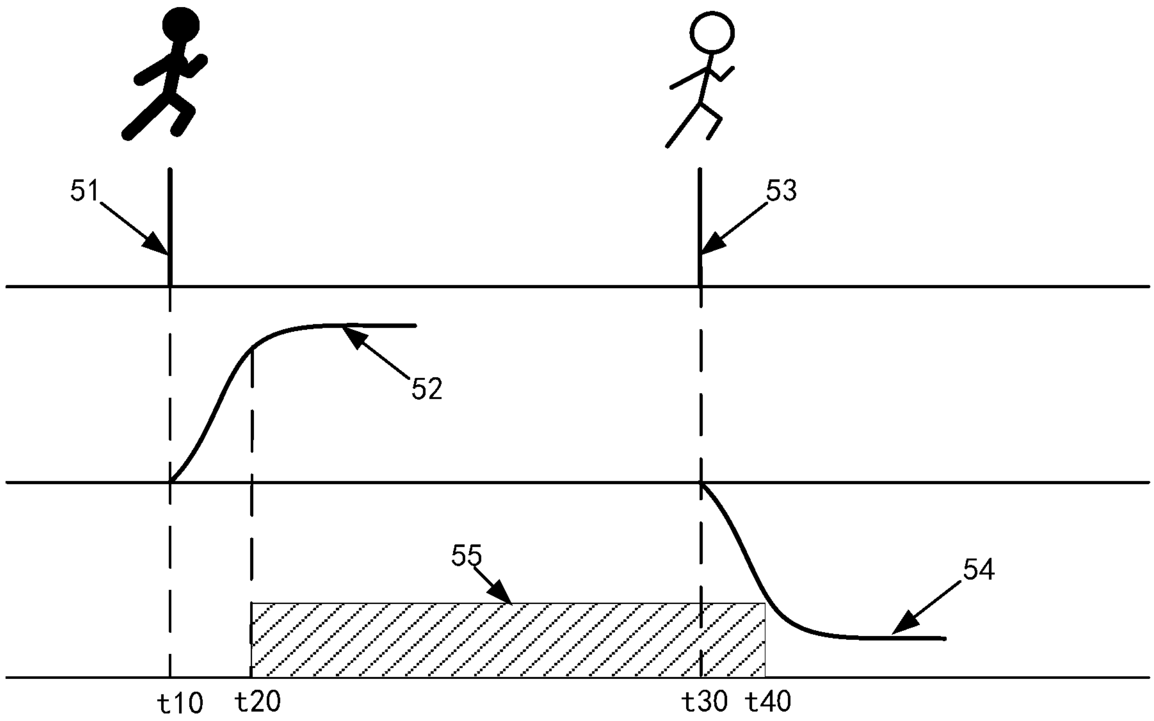
FIG. 5 is a schematic diagram of a signal waveform according to another embodiment of the present disclosure.

FIG. 5 is a schematic diagram of a signal waveform according to another embodiment of the present disclosure. In the embodiment shown in FIG. 5, taking the case where the first predetermined duration is greater than the second predetermined duration as an example for description, the heating body appears in the monitoring range at a time t10, the temperature in the monitoring range changes, the pyroelectric infrared sensor detects the second detection signal 51, the control unit starts from the time t10 to calculate the temperature difference data according to the stored first detection signal, a waveform 52 takes the time t1 as the starting time to continue the temperature difference data waveform within the time period of the second predetermined duration; and since when the heating body appears in the environment, the ambient temperature is finally changed from a stable state without the heating body to a stable state with the heating body as time goes by. That is, before the heating body enters the monitoring range and after the heating body enters and stays in the monitoring range for a certain time, the ambient temperature is in the stable state. Therefore, the temperature difference data waveform shown in the waveform 52 is increased from 0 to a certain value and then is kept unchanged. It is not difficult to understand that the value is a difference value between the ambient temperature in the stable state with the heating body and the ambient temperature in the stable state before the heating body enters the monitoring range. The temperature difference data at the time t20 is greater than the preset upper limit value, so the sensing signal is generated as the first signal at the time t20 and is continuously output.

The heating body in the monitoring range at the time t30 leaves, the temperature in the monitoring range changes, the pyroelectric infrared sensor detects the second detection signal 53, the control unit starts from the time t30 to calculate the temperature difference data according to the stored first detection signal, a waveform 54 takes the time t30 as the starting time to continue the temperature difference data waveform within the time period of the second predetermined duration; and since when the heating body in the environment leaves, the ambient temperature is finally changed from a stable state with the heating body to the stable state without the heating body as time goes by. That is, before the heating body leaves the monitoring range and after the heating body leaves the monitoring range for a certain time, the ambient temperature is in the stable state. Therefore, the temperature difference data waveform shown in the waveform 52 is reduced from 0 to a certain value and then is kept unchanged. It is not difficult to understand that the value is a difference value between the ambient temperature in the stable state before the heating body leaves the monitoring range and the ambient temperature in the stable state after the heating body leaves the monitoring range. The temperature difference data at a time t40 is less than the preset lower limit value, so the sensing signal is generated as the second signal at the time t40 and is continuously output.

A waveform 55 is a changing waveform of the sensing signal; before the time t20, the sensing signal is the second signal, representing that no heating body is present in the monitoring range in the time period; within the time t20-t40, the sensing signal is the first signal, representing that a heating body is present in the monitoring range in the time period; and after the time t40, the sensing signal is the second signal, representing that no heating body is present in the monitoring range in the time period.

Therefore, the heating body serves as an emitting source, a sensing apparatus performs signal receiving and processing, the presence condition of the heating body is converted into a vector on a one dimension, whether the presence condition of the heating body in the monitoring range is determined based on whether the output signal is the first signal or the second signal. Specifically, in the monitoring range, the heating body is present in the time period when the output signal is the first signal, and no heating body is present in the time period when the output signal is the second signal. Therefore, the complex operation is reduced, and medium and high-order core operand is not required, so that data may be processed by a low-cost structural component (for example, a single chip).

It should be understood that in the above embodiments, detecting the temperature and detecting the temperature change are implemented by the infrared sensor and the pyroelectric infrared sensor, respectively; and detecting the temperature and detecting the temperature change actually may be implemented by existing various manners, which will not be limited by the embodiments of the present disclosure.

Figure 6:
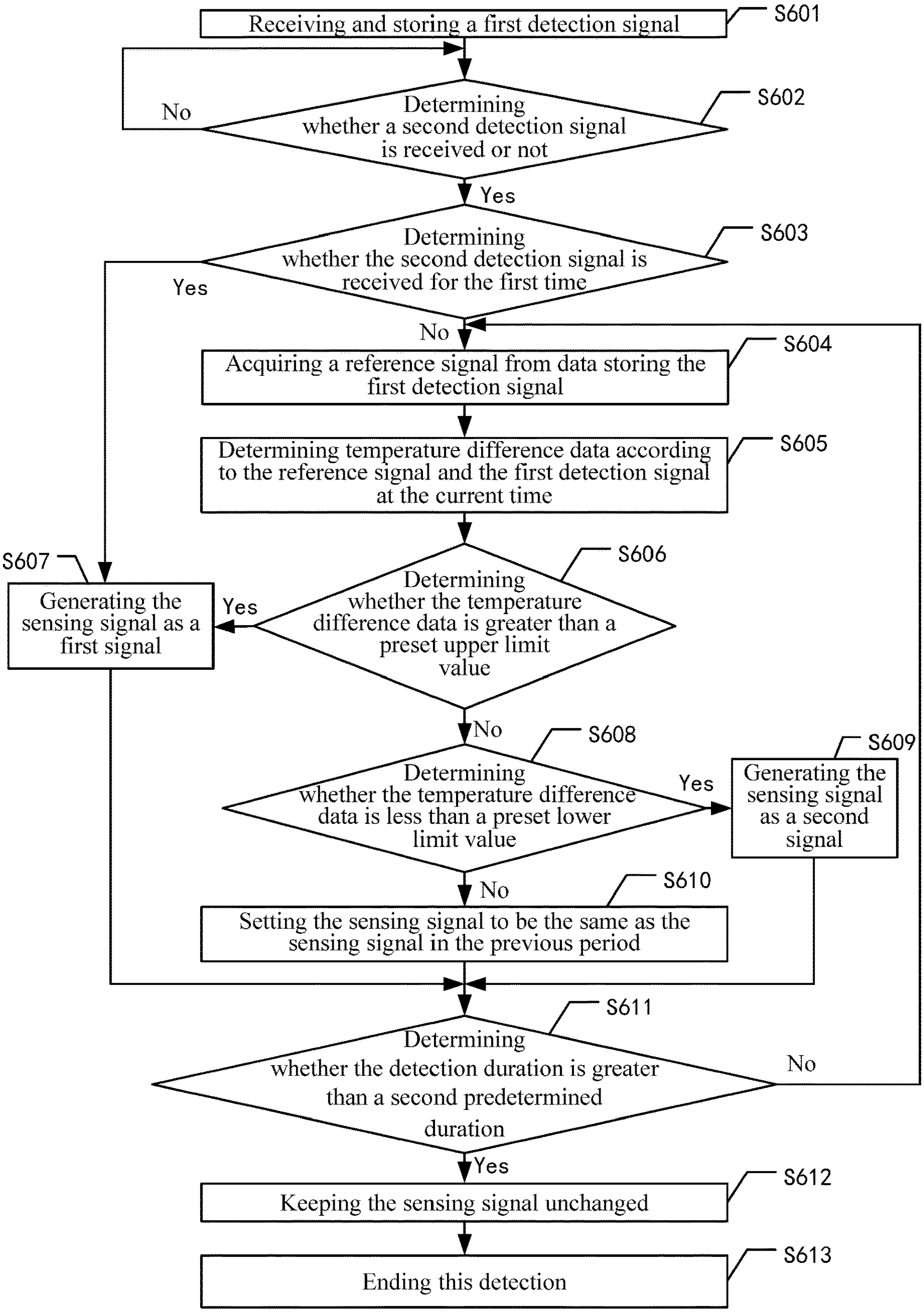
FIG. 6 is a detailed flowchart of a heating body sensing method according to an embodiment of the present disclosure.

FIG. 6 is a flowchart of a heating body sensing method according to an embodiment of the present disclosure. As shown in FIG. 6, the heating body sensing method according to the embodiment of the present disclosure includes the following steps:

Step S601: receiving and storing a first detection signal.

Specifically, the sensor (for example, the infrared sensor) capable of continuously receiving the heat source continuously detects the temperature in the monitoring range to acquire and store the first detection signal, where the first detection signal is used to represent the detection temperature.

Step S602: determining whether a second detection signal is received or not.

The moving heating body is detected by a device (for example, the pyroelectric infrared sensor) capable of detecting the moving heating body, thereby determining whether to acquire the second detection signal. In a case that the second detection signal is received, Step S603 is performed, otherwise, Step S602 is continuously performed to determine whether the second detection signal is received or not.

Step S603: determining whether the second detection signal is received for the first time.

In a case that the second detection signal is received for the first time, Step S607 is performed to direct generate a sensing signal, otherwise, Step S604 is entered.

Step S604: acquiring a reference signal from data storing the first detection signal.

Specifically, the reference signal is acquired from the data storing the first detection signal, and the reference signal is a first detection signal at a time corresponding to a first predetermined duration before the current time.

Step S605: determining temperature difference data according to the reference signal and the first detection signal at the current time.

Specifically, the reference signal is subtracted from the first detection signal at the current time to determine the temperature difference data.

Step S606: determining whether the temperature difference data is greater than a preset upper limit value.

In a case that the temperature difference data is greater than the preset upper limit value, Step S607 is performed, otherwise, Step S608 is performed.

Step S607: generating the sensing signal as a first signal.

In this step, the sensing signal in the current period is generated as the first signal and is output to represent the presence of the heating body.

Step S608: determining whether the temperature difference data is less than a preset lower limit value.

In a case that the temperature difference data is less than the lower limit value, Step S609 is performed, otherwise, Step S610 is performed.

Step S609: generating the sensing signal as a second signal.

In this step, the sensing signal in the current period is generated as the second signal and is output to represent that no heating body is present.

Step S606 and Step S608 do not have a fixed performing relationship. In an optional implementation manner, Step S608 is performed and then Step S606 is performed. In an optional implementation manner, Step S606 and Step S608 are performed at the same time.

Step S610: setting the sensing signal to be the same as the sensing signal in the previous period.

Specifically, in a case that the temperature difference data is greater than or equal to a preset lower limit value and less than or equal to the preset upper limit value, the sensing signal in the current period is set to be the same as the sensing signal in the previous period.

Step S611: determining whether the detection duration is greater than a second predetermined duration.

In a case that the detection duration is greater than or equal to the second predetermined duration, Step S612 is performed, otherwise, Step S604 is performed and the next detection period is entered.

Step S612: keeping the sensing signal unchanged.

Step S613: ending this detection.

In a case that the detection duration is greater than the second predetermined duration, this detection is ended, and the sensing signal is kept as the sensing signal in the current period and is continuously output.

According to the embodiments of the present disclosure, a detection temperature is acquired by receiving a first detection signal and is stored, the change of a heat source is acquired according to a receiving state of a second detection signal, and a sensing signal is generated according to the first detection signal and the receiving state of the second detection signal to determine the presence condition of a heating body. Therefore, the sensing cost of the heating body may be reduced, and the sensing efficiency may be improved.

Figure 7:
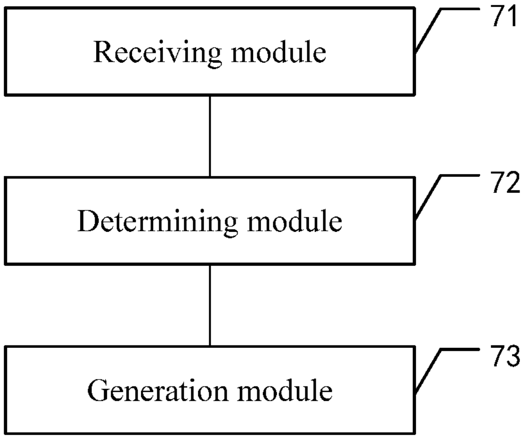
FIG. 7 is a schematic diagram of a heating body sensing apparatus according to an embodiment of the present disclosure.

FIG. 7 is a schematic diagram of a heating body sensing apparatus according to an embodiment of the present disclosure. As shown in FIG. 7, the apparatus includes: a receiving module 71, a determining module 72 and a generation module 73.

The receiving module 71 is configured to receive and store the first detection signal, where the first detection signal is used to represent the detection temperature. The determining module 72 is configured to determine a receiving state of the second detection signal, where the receiving state includes that: the second detection signal is received and the second detection signal is not received, and the second detection signal is used to represent that a heat source changes. The generation module 73 is configured to generate a sensing signal according to the first detection signal and the receiving state of the second detection signal, where the sensing signal is used to represent the presence condition of a heating body.

In some implementation manners, the sensing signal includes a first signal and a second signal, where the first signal is used to represent the presence of a heating body, and the second signal is used to represent the absence of a heating body.

In some implementation manners, the generation module 73 includes a first generation unit and a second generation unit. The first generation unit is configured to: in response to receiving the second detection signal which is received for the first time, generate the sensing signal as the first signal. The second generation unit is configured to: in response to receiving the second detection signal which is not received for the first time, generate the sensing signal according to a representation of the first detection signal.

In some implementation manners, the first detection signal at the time corresponding to the first predetermined duration before the current time is acquired from the data storing the first detection signal to serve as a reference signal, and the temperature difference data is determined according to the reference signal and the first detection signal at the current time. In response to that the temperature difference data is greater than a preset upper limit value, the sensing signal is generated as a first signal. In response to that the temperature difference data is less than a preset lower limit value, the sensing signal is generated as a second signal. in response to that the temperature difference data is greater than or equal to a preset lower limit value and is less than or equal to the preset upper limit value, keeping the sensing signal unchanged.

In some implementation manners, a detection duration is determined, where the detection duration is a time difference between a current time and a time when the second detection signal is received. In response to that the detection duration is less than or equal to a second predetermined duration, a next period is entered. In response to that the detection duration is greater than the second predetermined duration, this detection is ended and the sensing signal is kept unchanged. Therefore, the sensing signal is generated periodically according to the representation of the first detection signal.

Those skilled in the art should understand that the embodiment of the present disclosure may provide a method, an apparatus (a device) or a computer program product. Therefore, the present application may adopt a form of an entirely hardware embodiment, an entirely software embodiment, or an embodiment combining software with hardware. Furthermore, the present application may adopt a computer program product implemented on one or more computer-readable storage medium (including, but not limited to a magnetic disk memory, a CD-ROM, an optical memory, etc.) including a computer usable program code therein.

The present application is described with reference to flowcharts of the method, apparatus (device) and computer program product according to the embodiments of the present application. It should be understood that each procedure in the flowchart may be implemented by computer program instructions.

These computer program instructions may be stored in a computer-readable memory that may guide a computer or other programmable data processing devices to work in a specific manner, so that the instructions stored in the computer-readable memory produce an article of manufacture including an instruction apparatus, and the instruction apparatus implements specified functions in one or more processes of the flowchart.

The computer program instructions may also be provided to a general-purpose computer, a special-purpose computer, an embedded processor, or a processor of other programmable data processing devices to generate a machine, so that an apparatus for implementing specified functions in one or more procedures of the flowchart is generated by instructions executed by the computer or the processor of other programmable data processing devices.

Another embodiment of the present disclosure relates to a non-volatile readable storage medium, which is used to store a computer-readable program, where the computer-readable program is used to assist a computer to perform some or all of the method embodiments described above.

That is, those skilled in the art may understand that all or a part of steps in the method for implementing the above described embodiments may be accomplished by specifying a relevant hardware through a program. The program is stored in a readable storage medium and includes several instructions to enable a device (which may be a single chip, a chip, etc.) or a processor to perform all or a part of the steps of the methods in the embodiments of the present application. The storage medium includes: a USB flash disk, a mobile hard disk, a read-only memory (ROM), a random access memory (RAM), a magnetic disk or an optical disk and another medium that may store program codes.

The above description is only the preferred embodiment of the present disclosure and is not intended to limit the present disclosure, and various alterations and changes may be made in the present disclosure for those skilled in the art. Any modification, equivalent replacement, improvement, and the like made within the spirit and principle of the present disclosure should fall within the protection scope of the present disclosure.

We claim:

1. A heating body sensing method, comprising:

receiving and storing a first detection signal, the first detection signal being used to represent a detection temperature;

determining a receiving state of a second detection signal, wherein the receiving state comprises that: the second detection signal is received and the second detection signal is not received, and the second detection signal is used to represent that a heat source changes; and generating a sensing signal according to the first detection signal and the receiving state of the second detection signal, the sensing signal being used to represent the presence condition of a heating body;

wherein the generating a sensing signal according to the first detection signal and the receiving state of the second detection signal comprises:

determining a detection duration of a current period, the detection duration of the current period being a time difference between a current time and a time when the second detection signal is received;

in response to that the detection duration is less than or equal to a second predetermined duration, generating a sensing signal of the current period according to a representation of the first detection signal; and in response to that the detection duration is greater than the second predetermined duration, ending this detection and keeping the sensing signal unchanged.

2. The method according to claim 1, wherein the sensing signal comprises a first signal and a second signal, the first signal being used to represent the presence of a heating body, and the second signal being used to represent the absence of a heating body.

3. The method according to claim 2, wherein the generating a sensing signal according to the first detection signal and the receiving state of the second detection signal comprises:

in response to receiving the second detection signal which is received for the first time, generating the sensing signal as the first signal.

4. The method according to claim 2, wherein the generating a sensing signal according to the first detection signal and the receiving state of the second detection signal comprises:

in response to receiving the second detection signal which is not received for the first time, generating the sensing signal according to a representation of the first detection signal.

5. The method according to claim 4, wherein the generating the sensing signal according to a representation of the first detection signal specifically comprises:

generating the sensing signal periodically according to the representation of the first detection signal.

6. The method according to claim 5, wherein the generating a sensing signal of the current period according to the representation of the first detection signal comprises:

acquiring a reference signal from data storing the first detection signal, the reference signal being a first detection signal at a time corresponding to a first predetermined duration before the current time;

detecting temperature difference data according to the reference signal and the first detection signal at the current time;

in response to that the temperature difference data is greater than a preset upper limit value, generating the sensing signal as a first signal;

in response to that the temperature difference data is less than a preset lower limit value, generating the sensing signal as a second signal; and in response to that the temperature difference data is greater than or equal to a preset lower limit value and is less than or equal to the preset upper limit value, keeping the sensing signal unchanged.

7. A heating body sensing device, comprising:

a first detection unit, configured to acquire a first detection signal;

a second detection unit, configured to acquire a second detection signal; and a memory and a processor, wherein the memory is configured to store one or more computer program instruction, and the one or more computer program instructions are executed by the processor to implement the method according to claim 1.

8. The heating body sensing device according to claim 7, wherein the sensing signal comprises a first signal and a second signal, the first signal being used to represent the presence of a heating body, and the second signal being used to represent the absence of a heating body.

9. The heating body sensing device according to claim 8, wherein the generating a sensing signal according to the first detection signal and the receiving state of the second detection signal comprises:

in response to receiving the second detection signal which is received for the first time, generating the sensing signal as the first signal.

10. The heating body sensing device according to claim 8, wherein the generating a sensing signal according to the first detection signal and the receiving state of the second detection signal comprises:

in response to receiving the second detection signal which is not received for the first time, generating the sensing signal according to a representation of the first detection signal.

11. The heating body sensing device according to claim 10, wherein the generating the sensing signal according to a representation of the first detection signal specifically comprises:

generating the sensing signal periodically according to the representation of the first detection signal.

12. The heating body sensing device according to claim 11, wherein the generating a sensing signal of the current period according to the representation of the first detection signal comprises:

acquiring a reference signal from data storing the first detection signal, the reference signal being a first detection signal at a time corresponding to a first predetermined duration before the current time;

detecting temperature difference data according to the reference signal and the first detection signal at the current time;

in response to that the temperature difference data is greater than a preset upper limit value, generating the sensing signal as a first signal;

in response to that the temperature difference data is less than a preset lower limit value, generating the sensing signal as a second signal; and in response to that the temperature difference data is greater than or equal to a preset lower limit value and is less than or equal to the preset upper limit value, keeping the sensing signal unchanged.

13. A heating body sensing apparatus, comprising:

a receiving module, configured to receive and store a first detection signal, the first detection signal being used to represent a detection temperature;

a determining module, configured to determine a receiving state of a second detection signal, wherein the receiving state comprises that: the second detection signal is received and the second detection signal is not received, and the second detection signal is used to represent that a heat source changes; and a generation module, configured to generate a sensing signal according to the first detection signal and the receiving state of the second detection signal, the sensing signal being used to represent the presence condition of a heating body;

wherein the generation module is further configured to determine a detection duration of a current period, the detection duration of the current period being a time difference between a current time and a time when the second detection signal is received;

in response to that the detection duration is less than or equal to a second predetermined duration, generate a sensing signal of the current period according to a representation of the first detection signal; and in response to that the detection duration is greater than the second predetermined duration, end this detection and keep the sensing signal unchanged.

14. The heating body sensing apparatus according to claim 13, wherein the sensing signal comprises a first signal and a second signal, the first signal being used to represent the presence of a heating body, and the second signal being used to represent the absence of a heating body.

15. The heating body sensing apparatus according to claim 14, wherein the generating a sensing signal according to the first detection signal and the receiving state of the second detection signal comprises:

in response to receiving the second detection signal which is received for the first time, generating the sensing signal as the first signal.

16. The heating body sensing apparatus according to claim 14, wherein the generating a sensing signal according to the first detection signal and the receiving state of the second detection signal comprises:

in response to receiving the second detection signal which is not received for the first time, generating the sensing signal according to a representation of the first detection signal.

17. The heating body sensing apparatus according to claim 16, wherein the generating the sensing signal according to a representation of the first detection signal specifically comprises:

generating the sensing signal periodically according to the representation of the first detection signal.

18. The heating body sensing apparatus according to claim 17, wherein the generating a sensing signal of the current period according to the representation of the first detection signal comprises:

acquiring a reference signal from data storing the first detection signal, the reference signal being a first detection signal at a time corresponding to a first predetermined duration before the current time;

detecting temperature difference data according to the reference signal and the first detection signal at the current time;

in response to that the temperature difference data is greater than a preset upper limit value, generating the sensing signal as a first signal;

in response to that the temperature difference data is less than a preset lower limit value, generating the sensing signal as a second signal; and in response to that the temperature difference data is greater than or equal to a preset lower limit value and is less than or equal to the preset upper limit value, keeping the sensing signal unchanged.

* * * * *